United States Patent [19]

Vanderheiden

[11] 4,053,325
[45] Oct. 11, 1977

[54] HEAT STABLE IRON OXIDES
[75] Inventor: Dennis B. Vanderheiden, Easton, Pa.
[73] Assignee: Pfizer Inc., New York, N.Y.
[21] Appl. No.: 723,083
[22] Filed: Sept. 14, 1976
[51] Int. Cl.² .............................................. C09C 1/24
[52] U.S. Cl. ............................... 106/304; 106/308 B; 106/288 B; 106/292; 106/306
[58] Field of Search ................... 106/304, 308 B, 296, 106/306

[56] References Cited
U.S. PATENT DOCUMENTS

| | | | |
|---|---|---|---|
| 3,650,783 | 3/1972 | Yates | 106/288 B |
| 3,931,025 | 1/1976 | Woditsch et al. | 106/304 |
| 3,960,611 | 6/1976 | Waller et al. | 106/288 B |

Primary Examiner—Patrick P. Garvin
Assistant Examiner—J. V. Howard
Attorney, Agent, or Firm—Connolly and Hutz

[57] ABSTRACT

A thermally stable oxide product comprising particulate iron oxide coated with an insoluble metal metaphosphate in the amount of at least 1 percent by weight based on the weight of said product, wherein said iron oxide is hydrated ferric oxide or ferroso-ferric oxide, and wherein said metal is aluminum, barium, calcium, magnesium, iron or zinc, and said product is characterized by a procedural decomposition temperature of at least about 230° C. for the hydrated ferric oxide and about 180° C. for the ferroso-ferric oxide and a heat soak ΔE of at most about 4.0 for the hydrated ferric oxide and about 5.0 for the ferroso-ferric oxide. A process claim is also asserted.

13 Claims, No Drawings

HEAT STABLE IRON OXIDES

BACKGROUND OF THE INVENTION

This invention relates to iron oxide pigments of greatly improved thermal stability, and enhanced color quality.

Iron oxides exhibit good resistance to chemical attack, excellent light fastness and, in addition, are nontoxic. The combination of nontoxicity, high performance, and relatively low cost means that iron oxide pigments are in increasingly high demand. The principal drawback associated with many of the iron oxide pigments is their lack of thermal stability. While the red iron oxide, hematite, is stable to over 1000° C., the yellow oxide, hydrated ferric oxide, and the black oxide, ferroso-ferric oxide, are not thermally stable. Hydrated ferric oxide when heated above approximately 175° C. begins to lose its water of hydration and change from the desired yellow color to red or brown. Similarly, ferroso-ferric oxide when heated to above approximately 100° C. begins to oxidize and change from its desired black color to an undesirable red or brown. This thermal instability of the hydrated ferric oxide and ferroso-ferric oxide limits the applications where these very desirable pigments can be used.

There is a very substantial need for a thermally stable yellow pigment. The two principal reasons for this are:

1. The widely-used, thermally stable yellow pigments available today contain toxic heavy metals such as lead, antimony and chromium (VI).

2. The yellow pigments available today are relatively expensive; i.e., from five to ten times as expensive as conventional iron oxide pigments.

Thus, hydrated ferric oxide would constitute a very useful alternative if it possessed sufficient thermal stability.

Others have sought to overcome the problems of lack of thermal stability, and other deficiencies, in iron oxides. For example, the addition of soluble stabilizers during particle formation and growth is practiced in the production of magnetic iron oxides (Hund - U.S. Pat. No. 3,382,174; Wooditsch - U.S. Pat. No. 3,931,025). In these cases, arsenate or orthophosphate ion is incorporated into the hydrated ferric oxide crystal for the purpose of improving the magnetic properties of the subsequent $Fe_3O_4$ or $\gamma$-$Fe_2O_3$ formed (Hund, Wooditsch), as well as improving the particle shape, temperature resistance and production rate of $\gamma$-FeOOH (Hund).

Sherman, in U.S. Pat. No. 3,946,134, asserts that a 5-50% continuous, dense, protective skin of aluminum or magnesium phosphate will improve the light, heat and chemical stability of lead chromate and several organic pigments.

Abeck, (U.S. Pat. No. 3,652,334) teaches the use of surface coating $\alpha$-FeOOH with water soluble orthophosphate, metaphosphates, pyrophosphates, and oxyacids of phosphorus to reduce sintering during the high temperature reduction step of transforming $\alpha$-FeOOH to magnetic $\gamma$-$Fe_2O_3$. These coatings represent water soluble phosphates adsorbed onto the surface of the particle rather then insoluble metaphosphates precipitated onto the surface of the particle and, while they may reduce sintering, they do not effect the dramatic improvement in color and crystal stability that the insoluble metaphosphate coatings of this invention do.

Impurities introduced into the hydrated iron oxide crystal, especially at levels as high as 25% (Hund), degrade the color when compared with a pure hydrated iron oxide pigment. This is also true of high level surface coatings (e.g., Sherman, 50%). The low level surface treatment of the present invention, as low as 1% insoluble metaphosphate, does not alter the crystal morphology of the hydrated ferric oxide since the particle has been completely formed before coating. The result is a pigment with excellent color quality and superior thermal stability.

The product of this invention exhibits remarkable thermal stability, up to 18% greater than conventional yellow and black iron oxides. This dramatic improvement in thermal stability means that the hydrated ferric oxides and ferroso-ferric oxides of this invention can be used in a majority of the plastic, coil coating and powder coating applications where conventional yellow and black iron oxides cannot be used.

SUMMARY OF THE INVENTION

The present invention comprises a coated particle comprising a particulate substrate and a protective coating of insoluble metal metaphosphate wherein the coating comprises between about 1% and 20% of the total particle weight.

Further, the present invention comprises a thermally stable oxide product, said product comprising particulate iron oxide coated with an insoluble metal metaphosphate in the amount of at least 1% by weight based on the weight of said product, wherein said iron oxide is a hydrated ferric oxide or ferroso-ferric oxide and wherein said metal is aluminum, barium, calcium, magnesium, iron or zinc, and said product is characterized by a procedural decomposition temperature (pdt) of at least about 230° C. for the hydrated ferric oxide and about 180° C. for the ferroso-ferric oxide and a heat soak $\Delta E$ of not more than about 4.0 for the hydrated ferric oxide and 5.0 for the ferroso-ferric oxide.

The product wherein said metal metaphosphate is present in the amount of up to about 20% by weight, wherein said metal is iron or aluminum and wherein said iron oxide is a hydrated ferric oxide is preferred.

The present invention also comprises a process for the manufacture of the thermally stable oxide product above wherein an aqueous slurry comprising said iron oxide, a water-soluble metaphosphate, and a water-soluble salt of said metal is heated at a temperature of from about 50 to 100° C. until said insoluble metal metaphosphate precipitates on the surface of said oxide, and the resulting coated oxide product is recovered.

The process wherein said metal is iron or aluminum, and wherein said iron oxide is hydrated ferric oxide is preferred.

Also the process wherein said soluble metaphosphate is an alkali metal metaphosphate is preferred and sodium metaphosphate is especially preferred.

DETAILED DESCRIPTION OF THE INVENTION

Hydrated ferric oxide loses water at about 175°-200° C. and in the process, changes from yellow to red or brown iron oxide. This thermal decomposition, accompanied by the color change, limits the applications for which yellow iron oxide pigments can be used. In the course of studying methods of improving the thermal stability of yellow iron oxides, it was found that the thermal stability and, consequently, color stability of the hydrated ferric oxide could be dramatically improved by precipitating an insoluble metaphosphate from solution onto the surface of the yellow iron oxide particles. Further, it was found that the greatest improvement could be effected by surface treating with iron metaphosphate and that as little as 1% coating expressed as $Fe(PO_3)_2$ was effective. Higher coating levels, up to 20%, effectively improve the thermal stability of yellow iron oxide, however, no more so than lower coating levels. It is to be expected that even higher coating levels would give similar results. Higher coating levels are obviously less desirable since they, of necessity, tend to dilute the pigment (i.e., diminish its tinting strength). In addition, the greater the percentage of coating, the more the coating will degrade the color of the coated pigment with respect to the uncoated pigment. Metaphosphates of aluminum, barium, calcium, magnesium, iron and zinc were all relatively effective for improving the thermal stability of hydrated iron oxide, with iron metaphosphate being the best. Surface treatments with phosphates other than metaphosphates, such as orthophosphates or pyrophosphates, were by comparison ineffective.

This invention involves combining a soluble metaphosphate with a soluble metal salt such that the metal salt and metaphosphate may combine to form an insoluble metal metaphosphate. This precipitation is preferably done in the presence of the iron oxide particles and thus forms on the surface and adheres to the iron oxide particles.

At normal room temperatures this precipitation is quite slow; the presence of nucleating sites in the form of the iron oxide pigment increases the precipitation rate. Increasing the temperature of the slurry will increase the precipitation rate and a temperature of approximately 80° C. will allow about 70% of the coating to be precipitated in less than one-half hour. Temperatures as high as reflux ($\sim$100° C.) and as low as 50° C. have been employed with satisfactory results.

Examples of metaphosphates that are suitable for use in this invention are sodium metaphosphate (Fisher Scientific Co.), potassium metaphosphate (Pfaltz & Bauer, Inc. - not very soluble) and sodium hexametaphosphate (J. T. Baker Chemical Co., Calgon Corp., Hooker Chemical Corp., and Stauffer Chemical Co.). Naturally, the metaphosphates suitable for use in this invention are not limited to those mentioned, but this list is included only to illustrate examples that have been tested and found effective.

Studies indicate that effective metal metaphosphate coatings can be applied over a wide range of reaction conditons. Solids concentrations of the pigment slurry between 0.02 and 0.16 g/cc have been used and we believe that an even wider range of concentrations would be satisfactory, assuming good liquid mixing. The ratio of metal salt to soluble metaphosphate can vary from the exact stoichiometric amounts needed for a particular coating level (e.g., 5%, 10%, etc.) to large excesses of either reactant. Ten to twenty-fold excesses of metal salt have been frequently used and it is to be expected that as long as the limiting reagent is present in large enough quantities to give at least a 1% coating, then effective surface treatments can be applied.

It has been found that yellow iron oxides can be surface treated immediately after precipitation, but is not necessary. This is particularly convenient for yellow iron oxide made by the scrap iron or Penniman and Zoph Process (U.S. Pat. No. 1,368,478) because at the completion of yellow oxide precipitation there is a substantial amount of dissolved ferrous iron in the aqueous phase which can be allowed to react with soluble metaphosphate, thereby coating the pigment. Thus, after yellow iron oxide precipitation is complete, a stoichiometric amount of soluble metaphosphate can be added directly to the slurry to form the insoluble iron metaphosphate surface coating and then the coated yellow oxide can be processed just as a conventional yellow iron oxide would (i.e., filtered, washed, dried, milled, bagged, etc.).

As a general rule, commercial yellow iron oxide is made in an acidic environment and after synthesis it is washed, re-slurried and adjusted to a pH of 7–8 so that the finished pigment is about neutral. This process of adjusting the pH, usually with NaOH, has the added effect of lowering the adsorbed sulfate level of a yellow iron oxide made from ferrous sulfate. It has been observed that washed yellow oxide can still be effectively coated after this pH adjustment process and that the concomitant reduction in absorbed sulfates frequently yields a product exhibiting better thermal stability than if the oxide were coated before the pH adjustment process. Similarly, it is expected that yellow iron oxide made in an alkaline environment and then thoroughly washed could also be effectively coated.

The insoluble metal metaphosphate coatings of this invention, in particular the iron metaphosphate coating, has been found to be equally effective on $\alpha$-FeOOH and $\gamma$-FeOOH. These are the two principal yellow iron oxides of commercial significance. It is to be expected that this surface treatment would also be effective on the beta and delta forms of hydrated ferric oxide.

Black iron oxide, ferroso-ferric oxide, begins to oxidize when heated above about 100°–125° C. and change from its desired black color to an undesirable red or brown color. Like the yellow iron oxides, this thermal instability limits the applications for which black iron oxide pigments can be used. Surface treating black iron oxide with iron metaphosphate has been found to be a very effective method of improving its thermal stability. Thus, surface treatment with an insoluble metaphosphate not only inhibits dehydration of yellow iron oxide, but retards oxidation of black iron oxide.

Studies have shown that it is not necessary for the coating to consist entirely of one particular metal metaphosphate. Coatings have been prepared in which a mixed metal metaphosphate coating was applied to the pigment and it was found that these coatings effectively improved the thermal stability.

While only aluminum, barium, calcium, magnesium, iron, and zinc metal metaphosphates have been investigated, it is to be expected that other insoluble metal metaphosphates would also be effective. By analogy, metal metaphosphates of other transition metals, for example, cobalt, chromium, and manganese would also be expected to be satisfactory. In some cases, toxicity or relative expense would make such metals less desirable alternatives.

While this invention relates to iron oxide pigments of greatly improved thermal stability, it is nonetheless apparent that its utility may have a much wider scope. Thus, for example, the application of metaphosphates which are frequently used as sequestering agents in detergents and water treatments would be expected under the proper conditions to improve such properties as filterability and dispersibility of a coated pigment with respect to the uncoated pigment. Initial studies indicate that insoluble metal metaphosphate surface treatments lower the water demand of an iron oxide pigment when used in aqueous systems. Furthermore, in cases where yellow or black iron oxides are prescursors for other products, as in the synthesis of magnetic iron oxides, it is likely that the improved iron oxides of this invention will yield improved products. For example, the surface treated yellow and black iron oxides of this invention would allow higher dehydration and oxidation-reduction temperatures for the conversion to $\gamma$-$Fe_2O_3$, which in certain cases would be desirable (Abeck, U.S. Pat. No. 3,652,334). Also, it is to be expected that the thermal stability of other inorganic as well as organic pigments would be improved by an iron metaphosphate surface treatment. Thus, it is likely that pigments such as lead chromate, molybdate orange, iron blue, hansa yellow and others could have their thermal stability improved by an insoluble metal metaphosphate surface coating.

Thermal stability is a property of fundamental importance to dyes and pigments because in many cases the lack of thermal stability limits the applications for which a particular dye or pigment can be used. The measurement of improvement of thermal stability is by its very nature an empirical measurement; that is, it depends on the amount and characteristics of the material as well as the method of analysis. Whatever method is employed must be well-defined and easy to reproduce. The method we chose for making quantitative measurements of thermal stability for comparative purposes was that of thermogravimetry. Thermogravimetry is a thermal analysis technique in which the change in sample mass is recorded as a function of temperature. The procedural decomposition temperature (pdt), which is the temperature at which the cumulative mass-change reaches a magnitude that the thermobalance can detect[1], was the temperature used to compare the relative stabilities of different samples. For hydrated ferric oxide, this represents the temperature at which the weight loss resulting from loss of water is first detected by the thermobalance (see Equation 1).

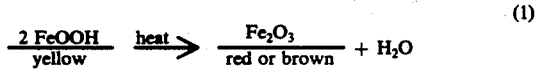

(1)

[1] W. W. Wendlandt, "Thermal Methods of Analysis," 2nd Edition, John Wiley and Sons, New York, New York, 1974, Chapter II. For ferroso-ferric oxide, the pdt corresponds to the temperature at which the weight gain resulting from oxidation is first detected by the thermobalance (see Equation 2).

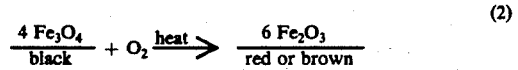

(2)

Thermogravimetric analysis was performed on all samples by first grinding them to a fine powder in a mortar and pestle and then recording their thermograms on a Model No. 226 Mettler TA-1 Thermoanalyzer. Model 91764 platinum/10% rhodium crucibles were used for the hydrated ferric oxides and model 91774 platinum/10% rhodium crucibles were used for the ferroso-ferric oxides. The thermograms were recorded under the instrumental conditions given in Table 1.

TABLE 1

| | INSTRUMENTAL FACTORS | |
|---|---|---|
| | Yellow Oxide | Black Oxide |
| Sample weight | 75 mg | 1000 mg |
| TGA sensitivity | 1.0 mg/in. | 10 mg/in. |
| Atmosphere | dry air | dry air |

TABLE 1-continued

| | INSTRUMENTAL FACTORS | |
|---|---|---|
| | Yellow Oxide | Black Oxide |
| Gas flow rate | 5.7 l/hr. | 5.7 l/hr. |
| Heating rate | 10° C/min. | 6° C/min. |
| Thermocouple | Pt Rh 10% - Pt | Pt Rh 10% - Pt |
| Reference Temperature | 25° C | 25° C |
| Temperature recoding | 2 mv full scale | 2 mv full scale |
| Chart speed | 6 in./hr. | 6 in./hr. |
| Sample holder | Mettler DT-20 | Mettler TG-20 |

In addition to thermogravimetry, the relative stabilities of a number of samples were compared in heat soak experiments. The heat soak was performed by placing 0.500 grams of sample in a 1.5 g., 57 mm diameter aluminum weighing dish with the sample spread thinly and uniformly over the entire bottom of the dish, and then placing the dish in a 232° C. oven for ten minutes. Only one sample at a time was placed in the oven. The heat soaked sample was then combined with 1.50 g of Dupont No. 960 $TiO_2$ and formulated into a nitrocellulose laquer using a modified ASTM-D387 procedure and drawn down beside an unheated portion of the same sample. The color difference between the heated and unheated samples was then measured using a Diano/-Hardy spectrophotometer and expressed in units of $\Delta E$ as defined by the FMC-II[2] color difference system. A smaller $\Delta E$ indicates less color change and, hence, better thermal stability. Table 2 shows some of these results and illustrates the dramatic improvement in color stability that is imparted to iron oxides treated in accordance with this invention.

[2] K. D. Chickering, J.O.S.A., 61, 118 (1971).

TABLE 2

| SAMPLE | pdt | E |
|---|---|---|
| Uncoated hydrated alpha ferric oxide | 209° | 17.0 |
| Coated hydrated ferric oxide (Product of Example 1) | 252° | 1.4 |
| Uncoated ferroso-ferric oxide | 134° | 15.7 |
| Coated ferroso-ferric oxide (Product of Example 16) | 208° | 4.0 |

The following examples are presented to more fully illustrate the present invention.

EXAMPLE I

Thirty-three liters of hydrated alpha ferric oxide slurry having a solids concentration of 0.0734 g/cc as $Fe_2O_3.H_2O$ and a ferrous concentration of 0.0256 g/cc as $FeSO_4$ were placed in a 75 liter tank and heated to 80° C. A solution of 126.4 g. of sodium metaphosphate dissolved in 300 cc of water was heated to 80° C. and then added to the hydrated alpha ferric oxide slurry with vigorous agitation. The slurry was then stirred for 30 minutes while maintaining the temperature at 80° C. The resulting surface coated hydrated alpha ferric oxide was then recovered by filtering, washing and drying at 110° C. The product exhibited a procedural decomposition temperature (pdt) of 252° C., a $\Delta E$ of 1.4, and 1.00% phosphorus or 3.45% $Fe(PO_3)_2$ was found by chemical analysis.

EXAMPLE II

A 3.5 liter slurry of hydrated alpha ferric oxide having a solids concentration of 0.1584 g/cc as $Fe_2O_3.H_2O$ and a ferrous concentration of 0.0231 g/cc as $FeSO_4$ was placed in a 4 liter beaker and heated to 80° C. A solution of 26.44 g. of sodium metaphosphate dissolved in 100 cc of water was heated to 80° C. and then added to the hydrated alpha ferric oxide slurry with vigorous agitation. The slurry was maintained at 80° C. and stirred for 30 minutes, at which time the coated product was recovered by filtering, washing and drying at 110° C. The product exhibited a pdt of 251° C., a ΔE of 1.8, and 0.29% P or 1.00% $Fe(PO_3)_2$ was found by chemical analysis.

EXAMPLE III

A 425 cc slurry of hydrated alpha ferric oxide which had a solids concentration of 0.1088 g/cc as $Fe_2O_3.H_2O$ and a ferrous concentration of 0.0198 g/cc as $FeSO_4$ was heated to 80° C. and then 2.21 g. of sodium metaphosphate dissolved in 100 cc of water and also heated to 80° C. was added with vigorous agitation. The slurry was maintained at 80° C. and stirred for 30 minutes, at which time the coated product was recovered by filtering, washing and drying at 110° C. The product exhibited a pdt of 261° C., a ΔE of 1.8, and 0.63% P or 2.17% $Fe(PO_3)_2$ was found by chemical analysis.

EXAMPLE IV

Four liters of hydrated alpha ferric oxide slurry having a solids concentration of 0.0429 g/cc as $Fe_2O_3.H_2O$ and a ferrous concentration of 0.0299 g/cc as $FeSO_4$ was heated to 80° C. A solution of 32.54 g of sodium metaphosphate dissolved in 100 cc of water was added to the hot slurry and stirred for one hour. The resulting surface coated hydrated alpha ferric oxide was recovered by filtering, washing and drying at 110° C. The product exhibited a pdt of 263° C., a ΔE of 2.0, and 4.95% P or 17.10% $Fe(PO_3)_2$ was found by chemical analysis.

EXAMPLE V

A 500 cc slurry of hydrated alpha ferric oxide having a solids concentration of 0.0225 g/cc as $Fe_2O_3.H_2O$ and a ferrous concentration of 0.00863 g/cc as $FeSO_4$ was heated to 80° C. A 0.535 g solid addition of powdered sodium metaphosphate was added to the hot slurry and stirred for 30 minutes. The coated product was then recovered by filtering, washing and drying at 110° C. The product exhibited a pdt of 254° C., a ΔE of 2.9, and 1.18% P or 4.07% $Fe(PO_3)_2$ was found by chemical analysis.

EXAMPLE VI

A 500 cc slurry of hydrated alpha ferric oxide having a solids concentration of 0.0225 g/cc as $Fe_2O_3.H_2O$ and a ferrous concentration of 0.00863 g/cc as $FeSO_4$ was heated to 80° C. A solution of 0.573 g of potassium metaphosphate dissolved in 100 cc of water was heated to 80° C. and then added to the hydrated alpha ferric oxide slurry with vigorous agitation. The 80° C. slurry was then stirred for 30 minutes and the coated product recovered by filtering, washing and drying at 110° C. The product exhibited a pdt of 240° C., a ΔE of 1.7, and chemical analysis found 1.00% P or 3.45% $Fe(PO_3)_2$.

EXAMPLE VII

A one liter slurry of hydrated alpha ferric oxide having a solids concentration of 0.0225 g/cc as $Fe_2O_3.H_2O$ and a ferrous concentration of 0.00863 g/cc as $FeSO_4$ was heated to 80° C. Solutions of 3.54 g of aluminum sulfate eighteen-hydrate and 1.185 g of sodium metaphosphate each dissolved in 50 cc of water were prepared and heated to 80° C. The aluminum sulfate solution was added to the slurry first and then after it was thoroughly mixed the sodium metaphosphate solution was added. The slurry was maintained at 80° C. and stirred for 30 minutes, at which time the mixed metal metaphosphate coated product was recovered by filtering, washing and drying at 110° C. The product exhibited a pdt of 236° C., a ΔE of 1.9, and 0.45% P and 0.09% Al were found by chemical analysis indicating 0.88% $Al(PO_3)_3$ and 0.48% $Fe(PO_3)_2$ for a total coating of 1.36% of the sample, with the iron metaphosphate being determined by difference.

EXAMPLE VIII

A one liter slurry of hydrated alpha ferric oxide having a solids concentration of 0.0225 g/cc as $Fe_2O_3.H_2O$ and a ferrous concentration of 0.00863 g/cc as $FeSO_4$ was heated to 80° C. Solutions of 1.11 g sodium metaphosphate, 0.471 g of aluminum sulfate eighteen-hydrate and 0.352 g of magnesium sulfate seven hydrate each dissolved in 50 cc of water were prepared and heated to 80° C. The aluminum sulfate and magnesium sulfate solutions were both added to the ferric oxide slurry and stirred well to get thorough mixing. The sodium metaphosphate solution was then added and the slurry was maintained at 80° C. and stirred for 30 minutes, at which time the mixed metal metaphosphate coated product was recovered by filtering, washing and drying at 110° C. The product exhibited a pdt of 237° C., a ΔE of 2.4, and 0.64% P, 0.11% Al and 0.05% Mg were found by chemical analysis indicating 1.09% $Al(PO_3)_3$, 0.35% $Mg(PO_3)_2$ and 0.48% $Fe(PO_3)_2$ for a total coating of 1.92% of the sample, with the iron metaphosphate being determined by difference.

EXAMPLE IX

Sodium metaphosphate, 0.459 g, was added to a 200 cc slurry of hydrated alpha ferric oxide having a solids concentration of 0.0484 g/cc as $Fe_2O_3.H_2O$ and a dissolved ferrous sulfate concentration of 0.0209 g/cc as $FeSO_4$. The slurry was stirred for 24 hours at room temperature and then raised to 50° C. for 30 minutes. The iron metaphosphate coated product was recovered by filtering, washing and drying at 110° C. The product exhibited a pdt of 252° C., a ΔE of 2.6, and 1.05% P or 3.62% $Fe(PO_3)_2$ was found by chemical analysis.

EXAMPLE X

Sodium metaphosphate, 0.973 g, and aluminum sulfate eighteen-hydrate, 2.12 g, were added to a 200 cc slurry of hydrated alpha ferric oxide having a solids concentration of 0.0838 g/cc as $Fe_2O_3.H_2O$. The mixture was stirred at room temperature for 24 hours and then the temperature was raised to 80° C. for 30 minutes. The aluminum metaphosphate coated product was recovered by filtering, washing and drying at 110° C. The product exhibited a pdt of 240° C., a ΔE of 1.7, and 0.65% P or 1.84% $Al(PO_3)_3$ was found by chemical analysis.

EXAMPLE XI

Sodium metaphosphate, 0.578 g, and barium chloride two-hydrate, 1.38 g, were added to a 200 cc slurry of hydrated alpha ferric oxide having a solids concentration of 0.0838 g/cc as $Fe_2O_3.H_2O$. The mixture was stirred for 24 hours at room temperature and then raised to 80° C. for 30 minutes. The barium metaphosphate coated product was recovered by filtering, washing and drying at 110° C. The product exhibited a pdt of 237°

C., a ΔE of 2.5, and 0.35% P or 1.67% Ba(PO$_3$)$_2$ was found by chemical analysis.

EXAMPLE XII

Sodium metaphosphate, 0.863 g, and anhydrous calcium chloride, 0.942 g, were added to a 200 cc slurry of hydrated alpha ferric oxide having a solids concentration of 0.0838 g/cc as Fe$_2$O$_3$.H$_2$O. The mixture was stirred for 24 hours at room temperature and then the temperature was raised to 80° C. for 30 minutes. The calcium metaphosphate coated product was recovered by filtering, washing and drying at 110° C. The product exhibited a pdt of 240° C., a ΔE of 2.6, and 0.35% P or 1.12% Ca(PO$_3$)$_2$ was found by chemical analysis.

EXAMPLE XIII

Sodium metaphosphate, 0.937 g, and magnesium sulfate seven-hydrate, 2.27 g, were added to a 200 cc slurry of hydrated alpha ferric oxide having a solids concentration of 0.0838 g/cc as Fe$_2$O$_3$.H$_2$O. The mixture was stirred for 24 hours at room temperature and then the temperature was raised to 80° C. for 30 minutes. The magnesium metaphosphate coated product was recovered by filtering, washing and drying at 110° C. The product exhibited a pdt of 239° C., a ΔE of 2.0, and 0.40% P or 1.18% Mg(PO$_3$)$_2$ was found by chemical analysis.

EXAMPLE XIV

Sodium metaphosphate, 0.887 g, and zinc nitrate six-hydrate, 1.68 g, were added to a 200 cc slurry of hydrated alpha ferric oxide having a solids concentration of 0.0838 g/cc as Fe$_2$O$_3$.H$_2$O. The mixture was stirred for 24 hours at room temperature and then the temperature was raised to 80° C. for 30 minutes. The zinc metaphosphate coated product was recovered by filtering, washing and drying at 110° C. The product exhibited a pdt of 241° C., a ΔE of 2.1, and 0.37% P or 1.33% Zn(PO$_3$)$_2$ was found by chemical analysis.

EXAMPLE XV

A 750 cc slurry of hydrated gamma ferric oxide (lepidocrocite) having a solids concentration of 0.0668 g/cc as Fe$_2$O$_3$.H$_2$O and a ferrous concentration of 0.0324 g/cc as FeCl$_2$ was heated to 80° C. A 2.39 g solid addition of powdered sodium metaphosphate was added to the hot slurry and stirred for 30 minutes. The coated product was then recovered by filtering, washing and drying at 110° C. The product exhibited at pdt of 242° C. a ΔE of 2.7, and 1.8% P or 3.73% Fe(PO$_3$)$_2$ was found by chemical analysis.

EXAMPLE XVI

Sodium metaphosphate, 0.954 g, and ferrous sulfate seven-hydrate, 1.30 g, were added to 200 cc slurry of ferroso-ferric oxide having a solids concentration of 0.10 g/cc as Fe$_3$O$_4$. The mixture was stirred for 24 hours at room temperature and then raised to 50° C. for 30 minutes. The iron metaphosphate coated product was recovered by filtering, washing and drying at 50° C. The product exhibited a pdt of 208° C., a ΔE of 4.0 and 0.95% P or 3.30% Fe(PO$_3$)$_2$ was found by chemical analysis.

What is claimed is:

1. A coated particle comprising an iron oxide and a protective coating of insoluble metal metaphosphate wherein the coating comprises between about 1% and 20% of the total particle weight.

2. A thermally stable oxide product, said product comprising particulate iron oxide coated with an insoluble metal metaphosphate in the amount of at least 1% by weight based on the weight of said product, wherein said iron oxide is a hydrated ferric oxide or ferroso-ferric oxide and wherein said metal is aluminum, barium, calcium, magnesium, iron or zinc, and said product is characterized by a procedural decomposition temperature (pdt) of at least about 230° C. for the hydrated ferric oxide and about 180° C. for the ferroso-ferric oxide and a heat soak ΔE of not more than about 4.0 for the hydrated ferric oxide and 5.0 for the ferroso-ferric oxide.

3. The product of claim 2 wherein said metal metaphosphate is present in the amount of up to about 20% by weight.

4. The product of claim 2 wherein said metal is iron.

5. The product of claim 2 wherein said metal is aluminum.

6. The product of claim 2 wherein said iron oxide is a hydrated ferric oxide.

7. A process for the manufacture of the product of claim 2 comprising the steps of:
   a. preparing an aqueous slurry of an iron oxide;
   b. agitating the slurry;
   c. adding a water-soluble metaphosphate;
   d. adding a water-soluble salt of said metal; and
   e. stirring until the insoluble metal metaphosphate precipitates on the surface of said iron oxide and recovering the coated oxide product.

8. The process of claim 7 wherein said metal is iron.

9. The process of claim 7 wherein said metal is aluminum.

10. The process of claim 7 wherein said iron oxide is hydrated ferric oxide.

11. The process of claim 7 wherein said soluble metaphosphate is an alkali metal metaphosphate.

12. The process of claim 7 wherein said soluble metaphosphate is sodium metaphosphate.

13. The process of claim 7 wherein in step b) the slurry is heated to between 50° C and 100° C.

* * * * *